July 23, 1957 B. DENHAM ET AL 2,800,353
RECEPTACLE HANDLE
Filed Dec. 21, 1953
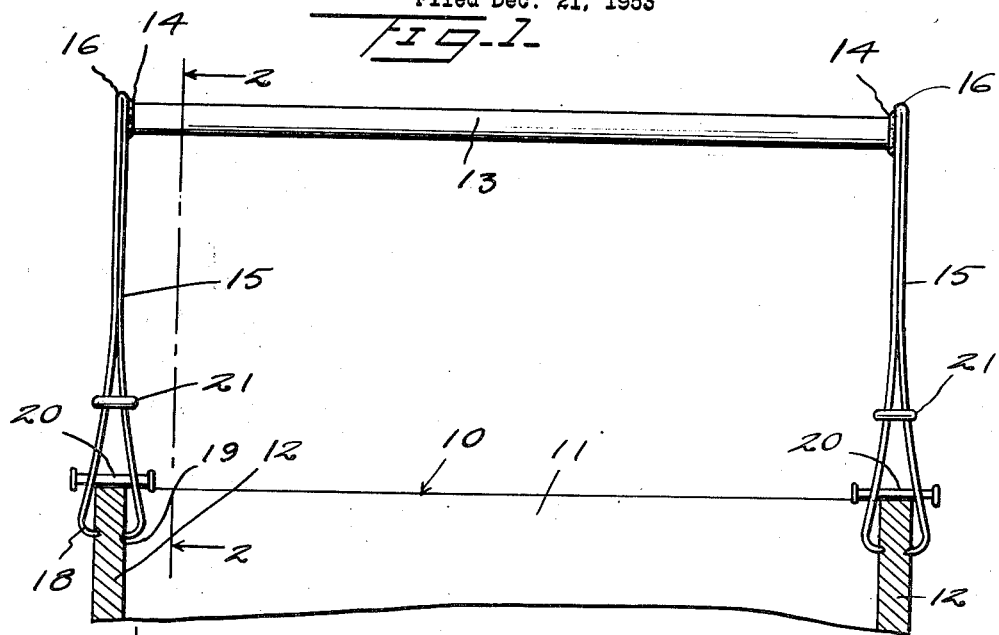
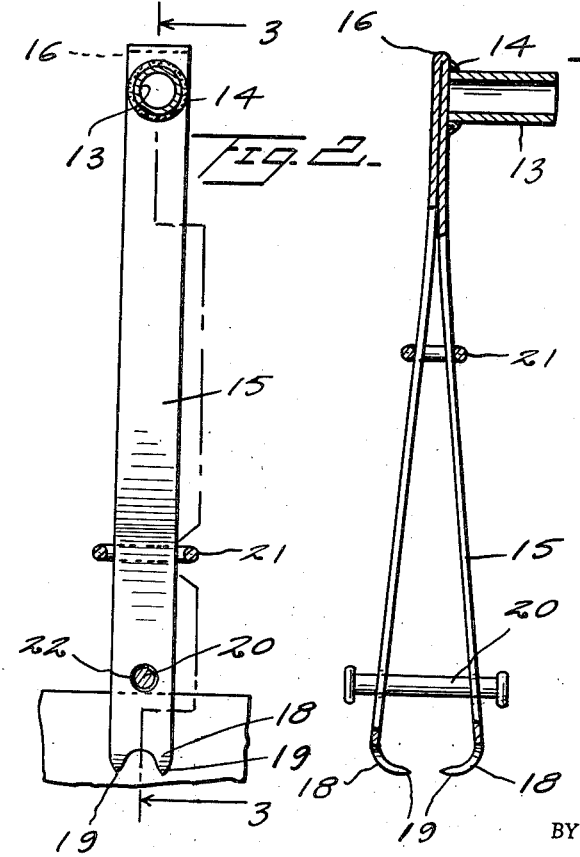
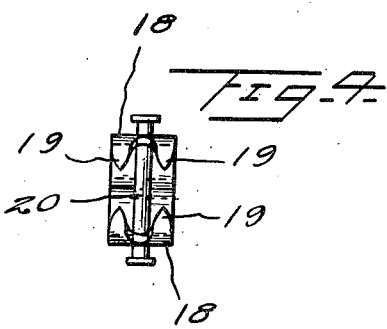
INVENTORS
Bert Denham
O. G. Sullivan
BY Kimmel & Crowell
ATTORNEYS

United States Patent Office 2,800,353
Patented July 23, 1957

2,800,353

RECEPTACLE HANDLE

Bert Denham and Osman G. Sullivan, Eugene, Oreg.

Application December 21, 1953, Serial No. 399,542

1 Claim. (Cl. 294—16)

This invention relates to a handle for containers, and more particularly to a handle for containers adapted to be employed in picking fruits or vegetables or the like.

A primary object of this invention is the provision of a handle which may be readily attached to and detached from a container or box or crate so that the same may be employed for receiving the fruits or the like as they are picked and transported by means of the handles to a storage space, the handles removed and the containers or receptacles stacked.

As conducive to a clearer understanding of this invention, it may here be pointed out that containers or crates for berries, fruits, vegetables and the like are usually made without handles in order to facilitate stacking and storage thereof. The transportation of such containers therefore usually requires the use of two hands resulting in multiplicity of carrying operations. A primary object of the instant invention therefore is the provision of a handle which may be readily attached to the filled crates whereby one may be transported in each hand and subsequently removed in order that the crates may be readily stacked one upon another.

An additional object of the invention is the provision of such a handle provided with resilient fingers adapted to grasp the opposite edges of the sides or end walls of the container and be held securely in engagement therewith and readily detached therefrom without the use of tools or the like.

Still other objects will in part be obvious and in part be pointed out hereinafter as the description of the invention proceeds, and shown in the accompanying drawing.

In the drawings:

Figure 1 is a side elevational view of one form of handle embodying features of the instant invention shown as applied to a container, the latter being shown partially in section and parts thereof being broken away;

Figure 2 is a sectional view taken substantially along the line 2—2, as viewed in the direction indicated by the arrows;

Figure 3 is a sectional view taken substantially along the line 3—3, as viewed in the direction indicated by the arrows; and Figure 4 is a bottom plan view of one of the gripping elements of Figure 1 shown as detached from the container.

Similar reference characters refer to similar parts throughout the several views of the drawing.

Referring now to the drawings in detail, there is generally indicated at 10 a container for berries or the like, including side walls 11, end walls 12, and a bottom wall (not shown).

The device of the instant invention includes a transverse tubular handle 13, the opposite ends of which are secured as by welding 14, and resilient depending pairs of spring fingers generally indicated at 15. The pairs of fingers 15 comprise essentially a single sheet of resilient material reverted at their upper extremities as at 16, adjacent the handlebar 13. The resiliency of the leaves or fingers 15 is to separate relative to each other, as indicated in Figure 1. The lower portion of each leaf 15 terminates in an inwardly extending arcuate finger 18, and each of the fingers being provided with double points 19, as best shown in Figure 4. This construction is optional since the points 19 are adapted to engage on opposite sides of the end walls 12, or alternatively the side walls 11 of the container 10. A compression ring 21 is positioned about each pair of leaves 15 and is slidable vertically therealong. A headed pin 20 loosely engages through openings 22 in each leaf 15 above the fingers 18 so as to limit the downward projection of the fingers 18 relative to the walls 12.

From the foregoing, the operation of the device should now be readily understandable. When it is desired to lift a container 10, rings 21 are moved upwardly to position shown in Figure 3, for example, whereupon the points 19 may be readily separated due to the normal resilience of the device. The spaced apart points 19 of the leaves are then positioned on opposite sides of the end walls 12 and the rings moved downwardly to the position shown in Figures 1 and 2, for example, the engagement of rings 21 with the sides of leaves 15 serving securely to clamp the points 19 into engagement with the opposite sides of the walls 12.

From the foregoing it will now be seen that there is herein provided an improved lifting handle for containers which may be readily attached to and detached from the container and which accomplishes all of the objects of this invention, and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

What we claim is:

A lifting handle for containers comprising a transverse handlebar, a pair of spring leaves normally biased away from each other secured at one of their ends to each end of said bar, a ring surrounding each pair of spring leaves for compressing said leaves towards each other longitudinally slidable thereon, and inwardly turned container gripping members at the other end of each leaf, each of said members comprising a double point, each of said pairs of leaves comprising a single sheet of resilient metal reverted to form a pair of leaves attached to said bar adjacent the point of reversion, said leaves having aligned apertures formed therein adjacent to but spaced from said points, a pin loosely engaging through said apertures in said leaves for limiting the downward projection of said points relative to the container, and heads formed on opposite ends of said pin to retain said pin in said apertures in said leaves.

References Cited in the file of this patent

UNITED STATES PATENTS

| | | |
|---|---|---|
| 389,925 | Griscom | Sept. 25, 1888 |
| 759,668 | Carlsen | May 10, 1904 |
| 1,412,201 | Westerhaus | Apr. 11, 1922 |
| 1,576,060 | Moss | Mar. 9, 1926 |
| 1,600,649 | Basini | Sept. 21, 1926 |
| 2,454,110 | Weaver | Nov. 16, 1948 |
| 2,576,235 | Nelson | Nov. 27, 1951 |

FOREIGN PATENTS

| | | |
|---|---|---|
| 472,667 | Great Britain | Sept. 28, 1937 |